(12) United States Patent
Laaksonen et al.

(10) Patent No.: US 11,194,439 B2
(45) Date of Patent: Dec. 7, 2021

(54) METHODS, APPARATUS, SYSTEMS, COMPUTER PROGRAMS FOR ENABLING MEDIATED REALITY

(71) Applicant: Nokia Technologies Oy, Espoo (FI)

(72) Inventors: Lasse Laaksonen, Tampere (FI); Arto Lehtiniemi, Lempaala (FI); Sujeet Shyamsundar Mate, Tampere (FI); Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 2 days.

(21) Appl. No.: 16/642,449

(22) PCT Filed: Sep. 6, 2018

(86) PCT No.: PCT/EP2018/073943
§ 371 (c)(1),
(2) Date: Feb. 27, 2020

(87) PCT Pub. No.: WO2019/048520
PCT Pub. Date: Mar. 14, 2019

(65) Prior Publication Data
US 2020/0192550 A1    Jun. 18, 2020

(30) Foreign Application Priority Data
Sep. 8, 2017 (EP) .................................. 17190112

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/011* (2013.01); *G06T 15/20* (2013.01);
(Continued)

(58) Field of Classification Search
None
See application file for complete search history.

(56) References Cited

U.S. PATENT DOCUMENTS

2012/0326966 A1    12/2012    Rauber

FOREIGN PATENT DOCUMENTS

EP        3413166 A1    12/2018
WO    2017/133933 A1     8/2017

OTHER PUBLICATIONS

Cirio, Gabriel, et al. "The magic barrier tape: a novel metaphor for infinite navigation in virtual worlds with a restricted walking workspace." Proceedings of the 16th ACM Symposium on Virtual Reality Software and Technology. 2009 (Year: 2009).*
(Continued)

*Primary Examiner* — Nurun N Flora
(74) *Attorney, Agent, or Firm* — Harrington & Smith

(57) ABSTRACT

A method comprising: using a tracked real point of view of a user in a real space and a first mapping between the real space and a virtual space to determine a point of view of a virtual user within the virtual space; causing rendering to the user at least part of a virtual scene determined by the point of view of the virtual user within the virtual space; and using a selected one of a plurality of different mappings to map tracked user actions in the real space to actions of the virtual user in the virtual space, wherein, when a first mode is selected, the method comprises mapping tracked user actions in the real space, using the first mapping, to spatially-equivalent actions of the virtual user in the virtual space, and wherein, when a second mode is selected, the method comprises mapping tracked user actions in the real space, using a second mapping different to the first mapping, to non-spatially-equivalent actions of the virtual user in the virtual space, wherein the second mapping makes available
(Continued)

user interactions within a zone of the virtual space unavailable using the first mapping.

23 Claims, 9 Drawing Sheets

(51) Int. Cl.
*G06T 15/20* (2011.01)
*H04S 3/00* (2006.01)
*H04S 7/00* (2006.01)

(52) U.S. Cl.
CPC ............... *H04S 3/008* (2013.01); *H04S 7/303* (2013.01); *H04S 2400/01* (2013.01); *H04S 2400/11* (2013.01)

(56) References Cited

OTHER PUBLICATIONS

English Translation of wipo publication WO2017133933 (Year: 2017).*
Extended European Search Report received for corresponding European Patent Application No. 17190112.7, dated Dec. 1, 2017, 9 pages.
International Search Report and Written Opinion received for corresponding Patent Cooperation Treaty Application No. PCT/EP2018/073943, dated Oct. 12, 2018, 13 pages.
Gabriel Cirio et al. "The Magic Barrier Tape" Proceedings of the 16th ACM Symposium on Virtual Reality Software and Technology; Nov. 18-20, 2009, Kyoto, Japan, ACM, 2 Penn Plaza, Suite 701, New York NY 10121-0701 USA, Nov. 18, 2009, pp. 155-162, XP058210129.

* cited by examiner

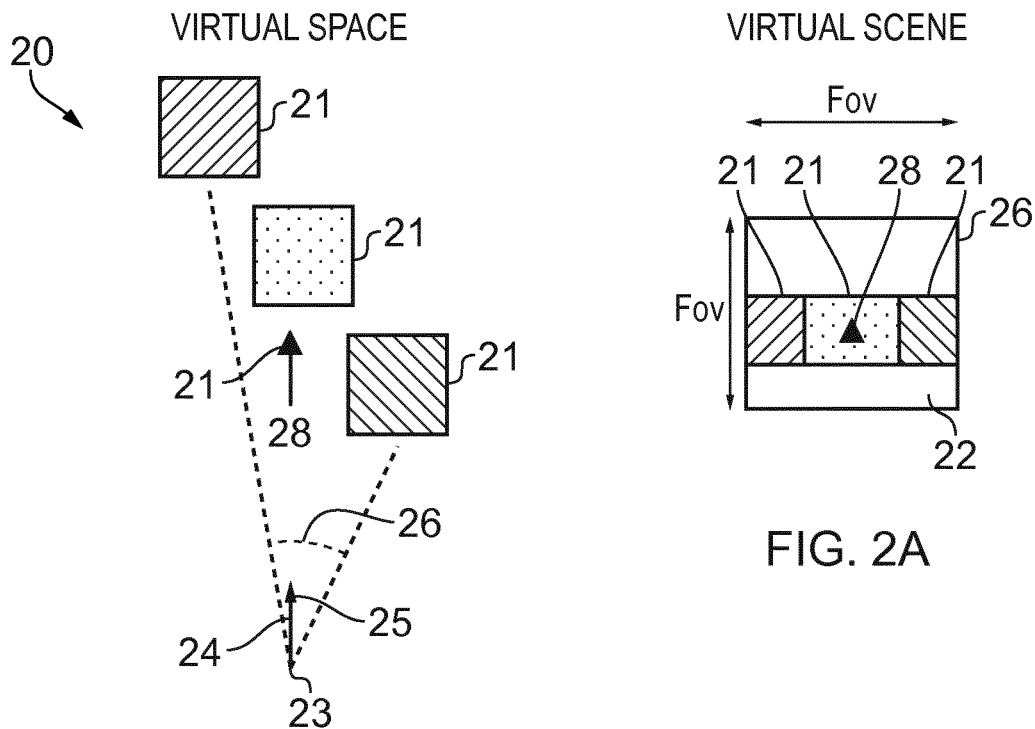
FIG. 1A
FIG. 2A
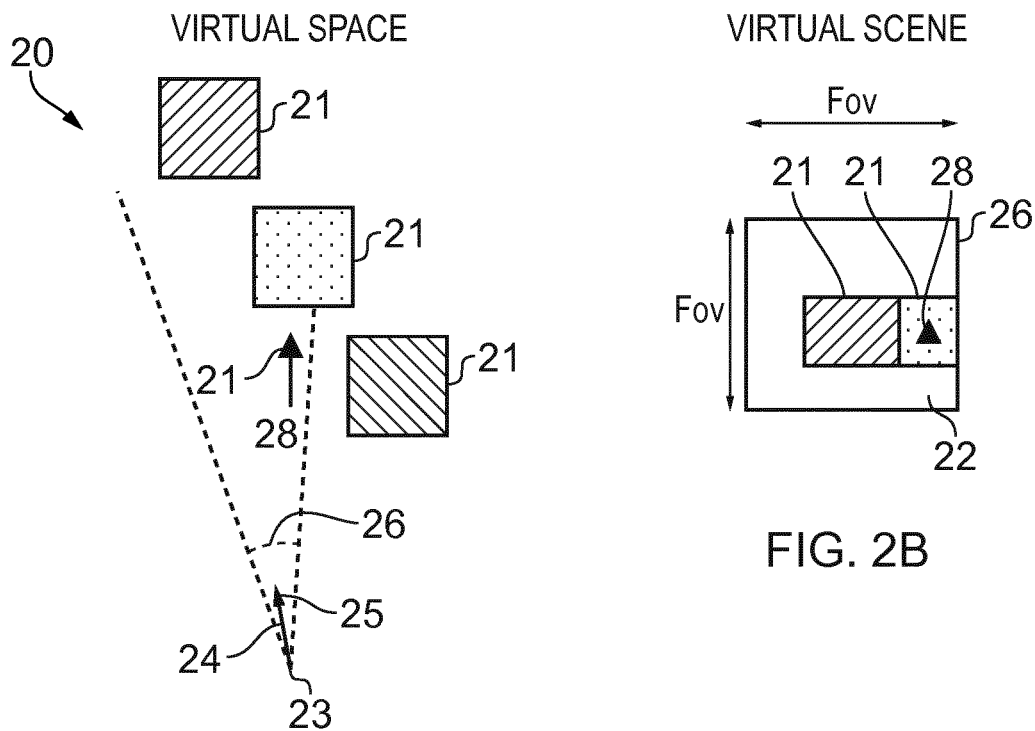
FIG. 1B
FIG. 2B

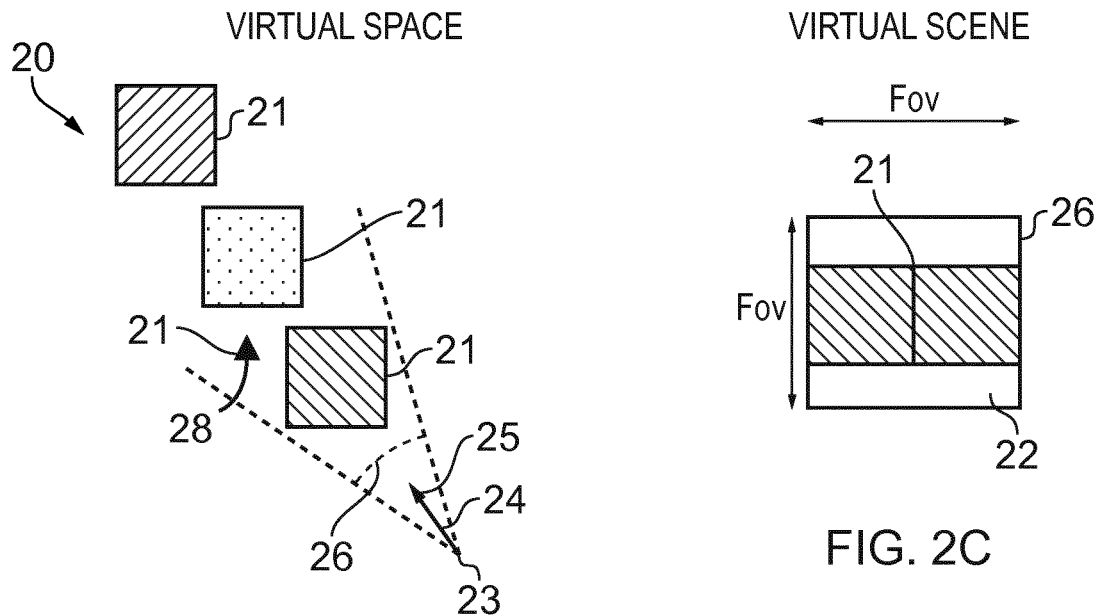
FIG. 1C
FIG. 2C
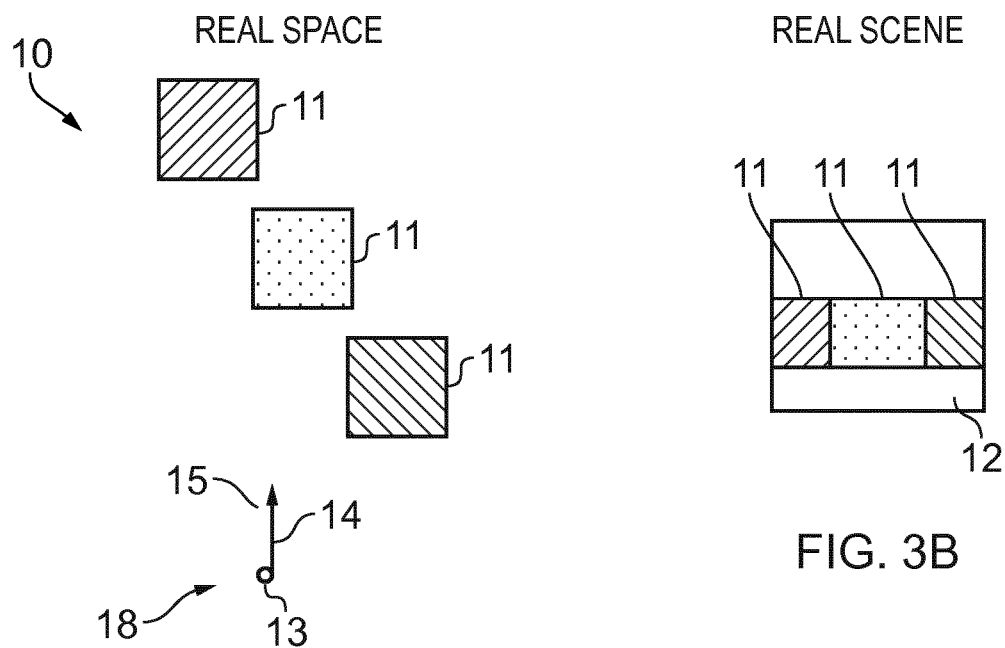
FIG. 3A
FIG. 3B

Real Space 10    Virtual Visual Space 20
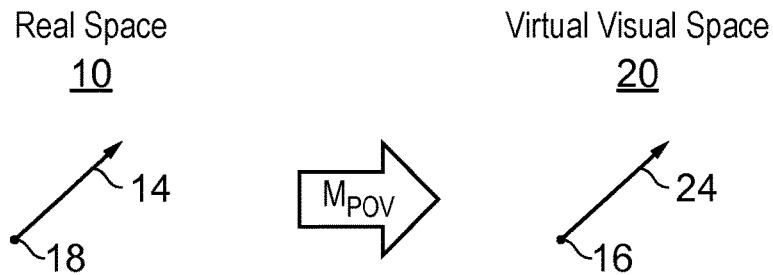
FIG. 10A
Real Space 10    Virtual Visual Space 20
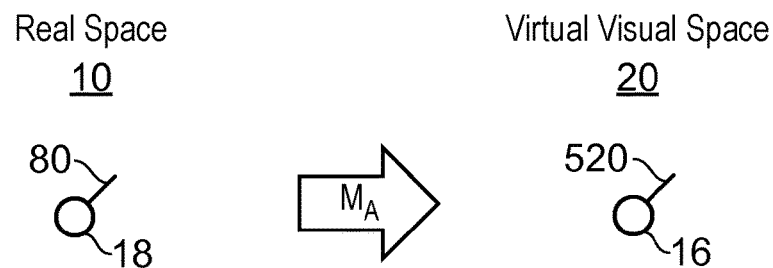
FIG. 10B
| | Real Space 10 | Mapping | Virtual Space 20 | Mode |
|---|---|---|---|---|
| 531 | PoV 14 | M1 | PoV 24 | 1 |
| | Action 80 | M1 | Action 520 | 1 |
| 532 | PoV 14 | M1 | PoV 24 | 2 |
| | Action 80 | M2 | Action 520 | 2 |
FIG. 11

METHODS, APPARATUS, SYSTEMS, COMPUTER PROGRAMS FOR ENABLING MEDIATED REALITY

RELATED APPLICATION

This application was originally filed as PCT Application No. PCT/EP2018/073943, filed on Sep. 6, 2018, which claims priority from EP Application No. 17190112.7, filed on Sep. 8, 2017.

TECHNOLOGICAL FIELD

Embodiments of the present invention relate to methods, apparatus, systems, computer programs for enabling mediated reality.

BACKGROUND

Mediated reality allows a user to visually experience a fully or partially artificial environment (a virtual space) as a virtual scene at least partially rendered by an apparatus to a user. The virtual scene is determined by a point of view of a virtual user within the virtual space. The point view of the virtual user depends upon a virtual location of the virtual user and a virtual orientation of the virtual user.

First-person perspective mediation means that user's real point of view within a real space determines the point of view of the virtual user within the virtual space, changing the virtual scene. The orientation of the virtual user depends on the user orientation. A variation in the user's real orientation determines a variation in the orientation of the virtual user within the virtual space.

In some but not necessarily all examples, the location of the virtual user depends on the user location. A variation in the user's real location determines a variation in the virtual location of the virtual user within the virtual space.

The mediated reality may be user interactive. User interactive means that user actions in the real space at least partially determine what happens within the virtual space. The user may, for example, be able to reach in real space to cause the virtual user to reach in virtual space and perform interactions.

It will therefore be appreciated that the ability to explore a virtual space may be limited because variation in a virtual location of the virtual user is constrained because the location of the virtual user does not depend on the user location or because the location of the virtual user does depend on the user location but variation of the user location is constrained, for example, by room boundaries and/or real objects.

BRIEF SUMMARY

A method comprising: using a tracked real point of view of a user in a real space and a first mapping between the real space and a virtual space to determine a point of view of a virtual user within the virtual space; causing rendering to the user at least part of a virtual scene determined by the point of view of the virtual user within the virtual space; and using a selected one of a plurality of different mappings to map tracked user actions in the real space to actions of the virtual user in the virtual space.

wherein, when a first mode is selected, the method comprises mapping tracked user actions in the real space, using the first mapping, to spatially-equivalent actions of the virtual user in the virtual space, and wherein, when a second mode is selected, the method comprises mapping tracked user actions in the real space, using a second mapping different to the first mapping, to non-spatially-equivalent actions of the virtual user in the virtual space, wherein the second mapping makes available user interactions within a zone of the virtual space unavailable using the first mapping.

According to various, but not necessarily all, examples of the disclosure there is provided a method comprising:
using a tracked real point of view of a user in a real space and a first mapping between the real space and a virtual space to determine a point of view of a virtual user within the virtual space;
causing rendering to the user at least part of a virtual scene determined by the point of view of the virtual user within the virtual space; and
using a selected one of a plurality of different mappings to map tracked user actions in the real space to actions of the virtual user in the virtual space According to various, but not necessarily all, examples of the disclosure there is provided a method comprising:
detecting an interrupt during rendering to a user at least part of a virtual scene determined by a point of view of a virtual user within a virtual space, wherein the point of view of the virtual user within the virtual space is determined by a tracked real point of view of the user in a real space and a first mapping between the real space and the virtual space and wherein the first mapping is used to map tracked user actions in the real space to actions of a virtual user in the virtual space;
in response to the interrupt, automatically causing use of a second mapping between the real space and the virtual space to map tracked user actions in the real space to actions of a virtual user in the virtual space while causing rendering to the user at least part of a virtual scene determined by the point of view of the virtual user within the virtual space, wherein the point of view of the virtual user within the virtual space is determined by the tracked real point of view of the user in the real space and the first mapping.

According to various, but not necessarily all, examples of the disclosure there is provided an apparatus comprising:
at least one processor; and
at least one memory including computer program code
the at least one memory and the computer program code configured to, with the at least one processor, cause the apparatus at least to perform:
causing use of a tracked real point of view of a user in a real space and a first mapping between the real space and a virtual space to determine a point of view of a virtual user within the virtual space;
causing rendering to the user at least part of a virtual scene determined by the point of view of the virtual user within the virtual space; and
causing use of a selected one of a plurality of different mappings to map tracked user actions in the real space to actions of the virtual user in the virtual space According to various, but not necessarily all, examples of the disclosure there is provided an apparatus comprising:
means for using a tracked real point of view of a user in a real space and a first mapping between the real space and a virtual space to determine a point of view of a virtual user within the virtual space;
means for causing rendering to the user at least part of a virtual scene determined by the point of view of the virtual user within the virtual space; and
means for using a selected one of a plurality of different mappings to map tracked user actions in the real space to actions of the virtual user in the virtual space According to various, but not necessarily all, examples of the disclosure there is provided a head mounted viewing device comprising the apparatus.

According to various, but not necessarily all, examples of the disclosure there is provided a computer program that when run on a processor causes any of the methods. The computer program may be stored on a non-transitory computer-readable storage medium.

According to various, but not necessarily all, embodiments of the invention there is provided examples as claimed in the appended claims.

BRIEF DESCRIPTION OF FIGURES

For a better understanding of various examples that are useful for understanding the detailed description, reference will now be made by way of example only to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

FIG. 10A illustrates an example of a POV mapping;

FIG. 10B illustrates an example of an action mapping;

FIG. 11 illustrates an example of different modes of operation and the mappings used;

DEFINITIONS

Figure 4:
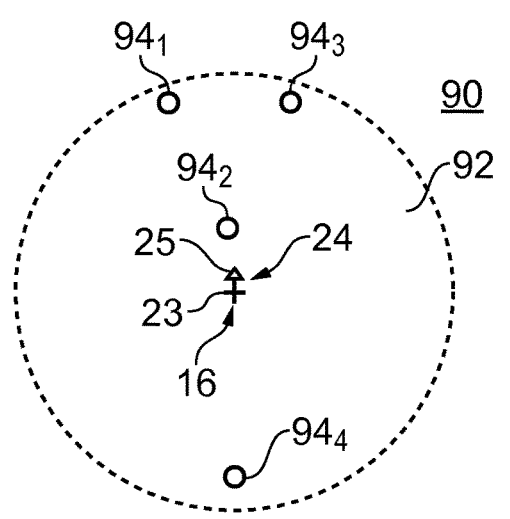
FIG. 4 illustrates, from a top perspective, an example of a sound space 90 that corresponds to the virtual visual space.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or position. A rendered sound object represents sounds rendered from a particular position.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view within the real space.

"real visual scene" refers to a representation of the real space viewed from a particular point of view within the real space.

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user.

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects.

"mediated reality content" is content which enables a user to visually experience a fully or partially artificial environment (a virtual space) as a virtual visual scene. Mediated reality content could include interactive content such as a video game or non-interactive content such as motion video.

"augmented reality content" is a form of mediated reality content which enables a user to visually experience a partially artificial environment (a virtual space) as a virtual visual scene. Augmented reality content could include interactive content such as a video game or non-interactive content such as motion video.

"virtual reality content" is a form of mediated reality content which enables a user to visually experience a fully artificial environment (a virtual space) as a virtual visual scene. Virtual reality content could include interactive content such as a video game or non-interactive content such as motion video.

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view (location and/or orientation) determines the point of view within the virtual space;

"third person perspective-mediated" as applied to mediated reality, augmented reality or virtual reality means perspective mediated with the additional constraint that the user's real point of view does not determine the point of view within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view in virtual space used to generate a perspective-mediated sound scene and/or visual scene.

"notional listener" defines the point of view in virtual space used to generate a perspective-mediated sound scene, irrespective of whether or not a user is actually listening "notional viewer" defines the point of view in virtual space used to generate a perspective-mediated visual scene, irrespective of whether or not a user is actually viewing.

DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual visual objects 21, however, each Fig illustrates a different virtual point of view 24 of a virtual user.

The virtual location 23 and virtual direction 25 of a virtual point of view 24 of the virtual user can change independently. The direction 25 but not the location 23 of the virtual point of view 24 of the virtual user changes from FIG. 1A to FIG. 1B. The direction 25 and the location 23 of the virtual point of view 24 of the virtual user changes from FIG. 1B to FIG. 1C.

FIGS. 2A, 2B, 2C illustrate a virtual visual scene 22 from the perspective of the different virtual points of view 24 of the virtual user of respective FIGS. 1A, 1B, 1C. The virtual visual scene 22 is determined by the virtual point of view 24 of the virtual user within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20. For example, a user may be able to select and move the virtual object 21.

The mediated reality, augmented reality or virtual reality may be perspective-mediated. In this case, user actions determine the virtual point of view 24 of the virtual user within the virtual visual space 20, changing the virtual visual scene 22. For example, as illustrated in FIGS. 1A, 1B, 1C a location 23 of the virtual point of view 24 of the virtual user within the virtual visual space 20 may be changed and/or a direction or orientation 25 of the virtual point of view 24 of the virtual user within the virtual visual space 20 may be changed. If the virtual visual space 20 is three-dimensional, the location 23 of the virtual point of view 24 of the virtual user has three degrees of freedom e.g. up/down, forward/back, left/right and the direction 25 of the virtual point of view 24 of the virtual user within the virtual visual space 20 has three degrees of freedom e.g. roll, pitch, yaw. The virtual point of view 24 of the virtual user may be continuously variable in location 23 and/or direction 25 and user action then changes the location and/or direction of the virtual point of view 24 of the virtual user continuously. Alternatively, the virtual point of view 24 of the virtual user may have discrete quantised locations 23 and/or discrete quantised directions 25 and user action switches by discretely jumping between the allowed locations 23 and/or directions 25 of the virtual point of view 24 of the virtual user.

FIG. 3A illustrates an example of a real space 10 comprising real objects 11 that partially correspond with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a point of view 14 corresponding to the virtual point of view 24 of the virtual user in the virtual visual space 20 of FIG. 1A. The real visual scene content is determined by that corresponding virtual point of view 24 of the virtual user and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single virtual point of view 24 of the virtual user or on multiple images from different points of view at the same time, processed to generate an image from a single virtual point of view 24 of the virtual user.

In augmented reality, the virtual content 28 is one or more virtual objects 21. The virtual scene 22 comprises the real scene 12, augmented or not by virtual content in dependence upon the virtual point of view 24 of the virtual user of the user 18.

In virtual reality, the virtual content 28 is the whole of the virtual scene and all virtual objects 21 within it. The virtual scene 22 comprises only the virtual content 28 determined in dependence upon the virtual point of view 24 of the virtual user.

FIG. 4 illustrates, from a top perspective, an example of a sound space 90 that corresponds to the virtual visual space 20. FIG. 4 is a two-dimensional projection or cross-section of the three dimensional sound space 90. The sound space 90 defines a sound scene 92.

In some but not necessarily all examples, the virtual visual space 20 and the sound space 90 may be corresponding and form a combined virtual space 90,20. "Correspondence" or "corresponding" when used in relation to a sound space and a virtual visual space means that the sound space 90 and virtual visual space 20 are time and space aligned as combined virtual space 90,20, that is they are the same space at the same time.

The correspondence between virtual visual space 20 and sound space 90 results in correspondence between the virtual visual scene 22 and the sound scene 92 to form a combined virtual scene 92,22. "Correspondence" or "corresponding" when used in relation to a sound scene 92 and a virtual visual scene 22 means that the sound space 90 and virtual visual space 20 are corresponding and a notional listener (virtual user) whose point of view defines the sound scene 92 and a notional viewer (virtual user) whose point of view defines the virtual visual scene 22 are at the same location and orientation, that is they have the same virtual point of view 24 of the same virtual user.

In FIG. 4, the sound space 90 and the virtual visual space 20 form a combined virtual space 90,20. The sound space 90 is an arrangement of sound sources 94 in a three-dimensional space. In this example, the sound space 90 is a rendered sound space and the sound sources 94 comprise sound objects 110.

The sound space 90 defines a sound scene 92 that corresponds to the virtual visual scene 22.

The sound scene 92 and the virtual visual scene 22 form a combined virtual scene 92, 22. The sound scene 92 is a representation of the sound space 90 listened to from a particular virtual point of view 24 of the virtual user (notional listener) 16 within the sound space 90. The sound scene 92 is first person perspective-mediated. The user's real point of view 14 determines the virtual point of view 24 of the virtual user 16 within the sound space, changing the sound scene 92.

In this example, the virtual point of view 24 of the virtual user within the sound space 90 corresponds to the virtual point of view 24 of the virtual user within the virtual visual space 20 and the same label is used. The virtual scene 92,22 is first person perspective-mediated. The user's real point of view 14 determines the virtual point of view 24 of the virtual user of the virtual user 16 within the combined virtual space 90, 20, changing the combined virtual scene 92, 22.

Correspondence in this sense means that there is a one-to-one mapping between the sound space 90 and the virtual visual space 20 such that a position in the sound space 90 has a corresponding position in the virtual visual space 20 and a position in the virtual visual space 20 has a corresponding position in the sound space 90. Correspondence in this sense means that there is a one-to-one mapping between the sound scene 92 and the virtual visual scene 22 such that a position in the sound scene 92 has a corresponding position in the virtual visual scene 22 and a position in the virtual visual scene 22 has a corresponding position in the sound scene 92. Corresponding also means that the coordinate system of the sound space 90/sound scene 92 and the coordinate system of the virtual visual space 20/virtual visual scene 22 are in register such that an object is positioned as a sound object in the sound scene and as a visual object in the visual scene at the same common position from the perspective of a virtual user 16.

In this illustrated example, the user actions determine the virtual point of view 24 of the virtual user within the sound space 90 (and virtual visual space 20), changing the sound scene 92 and the virtual visual scene 22 simultaneously. For example, a location 23 of the virtual point of view 24 of the virtual user within the virtual space 92, 20 may be changed and/or a direction or orientation 25 of the virtual point of view 24 of the virtual user within the virtual space 92, 20 may be changed. If the virtual space 92, 20 is three-dimensional, the location 23 of the virtual point of view 24 of the virtual user has three degrees of freedom e.g. up/down, forward/back, left/right and the direction 25 of the virtual point of view 24 of the virtual user within the virtual visual space 20 has three degrees of freedom e.g. roll, pitch, yaw. The virtual point of view 24 of the virtual user may be continuously variable in location 23 and/or direction 25 and user action then changes the location and/or direction of the virtual point of view 24 of the virtual user continuously. Alternatively, the virtual point of view 24 of the virtual user may have discrete quantised locations 23 and/or discrete quantised directions 25 and user action switches by discretely jumping between the allowed locations 23 and/or directions 25 of the virtual point of view 24 of the virtual user.

The functionality that enables control of a virtual visual space 20 and the virtual visual scene 26 dependent upon the virtual visual space 20 and the functionality that enables control of a sound space and the sound scene 92 dependent upon the sound space 90 may be provided by the same apparatus, system, method or computer program.

Figure 5:
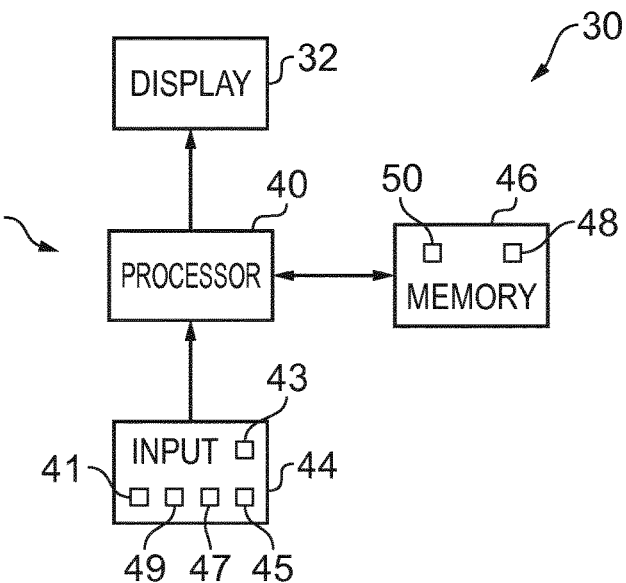
FIG. 5 illustrates an example of an apparatus that is operable to enable mediated reality and/or augmented reality and/or virtual reality.

FIG. 5 illustrates an example of an apparatus 30 that is operable to enable mediated reality and/or augmented reality and/or virtual reality.

The apparatus 30 comprises a rendering device or devices 32, which may render information to a user visually via a display, aurally via one or more audio outputs 32, for example via loudspeakers, and/or haptically via a haptic device.

The audio output device 32 may comprise one or more spatially distributed audio sources. For example, binaural loudspeakers may be separated in a head mounted audio (HMA) device, loudspeakers may be spatially separated in a sound bar or in a distributed loudspeaker arrangement e.g. 5.1 or 7.1 surround sound.

The display 32 is for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc. The display may be a head-mounted display (HMD), a hand-portable display or television display or some other display.

The rendering device or devices 32 are controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 5 the controller 42 may comprise a processor 40 configured to load computer program instructions 48 from a memory 46. The controller 42 may be implemented using instructions that enable hardware functionality, for example, by using executable computer program instructions 48 in a general-purpose or special-purpose processor 40 that may be stored on a computer readable storage medium (disk, memory etc.) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 6A & 6B. The processor 40 by reading the memory 46 is able to load and execute the computer program 48.

The apparatus 30 may enable user-interactive mediation for mediated reality and/or augmented reality and/or virtual reality. The input circuitry 44 tracks (detects over time) user actions using user input 43. These user actions are used by the controller 42 to determine what happens within the virtual space. This may enable interaction with a visual element 28 within the virtual visual space 20.

The apparatus 30 may enable perspective mediation for mediated reality and/or augmented reality and/or virtual reality. The input circuitry 44 tracks (detects over time) user actions. These user actions are used by the controller 42 to determine the virtual point of view 24 of the virtual user within the virtual space, changing the virtual scene. The virtual point of view 24 of the virtual user may be continuously variable in location and/or direction and user action changes the location and/or direction of the virtual point of view 24 of the virtual user. Alternatively, the virtual point of view 24 of the virtual user may have discrete quantised locations and/or discrete quantised directions and user action switches by jumping to the next location and/or direction of the virtual point of view 24 of the virtual user.

The apparatus 30 may enable first person perspective for mediated reality, augmented reality or virtual reality. The input circuitry 44 detects the user's real point of view 14 using point of view sensor 45. The user's real point of view is used by the controller 42 to determine the virtual point of view 24 of the virtual user within the virtual space, changing the virtual scene. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze.

A head-mounted apparatus 30, may be used to enable first-person perspective mediation by measuring a change in location and/or a change in orientation of the user's head and/or a change in the user's direction of gaze. The head-mounted apparatus 30 may, for example, operate as a head mounted audio (HMA) device, a head mounted display (HMD) device or a combined head mounted display and audio (HMDA) device, In some but not necessarily all examples, the apparatus 30 comprises as part of the input circuitry 44 point of view sensors 45 for determining changes in the real point of view.

For example, positioning technology such as GPS, HAIP (high-accuracy indoor positioning), triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images. In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with structured light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
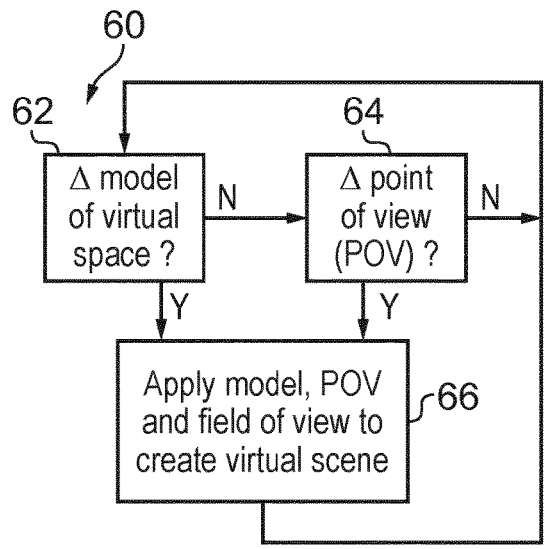
FIG. 6A illustrates an example of a method for enabling mediated reality and/or augmented reality and/or virtual reality.

The apparatus 30 may enable mediated reality and/or augmented reality and/or virtual reality, for example using the method 60 illustrated in FIG. 6A or a similar method. The controller 42 stores and maintains a model 50 of the virtual space 20 including a mapping between the physical space 10 and the virtual space 10.

The model may be provided to the controller 42 or determined by the controller 42. For example, sensors in input circuitry 44 may optionally be used to create overlapping depth maps of the real space from different points of view, virtual content is added, to produce and change the model.

Each real location 13 in the physical space 10, through the mapping, has a corresponding virtual location 23 in the virtual space 20 and vice versa. Each real orientation 15 in the physical space 10, through the mapping, has a corresponding virtual orientation 25 in the virtual space 20 and vice versa.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a location of the object.

At block 62 it is determined whether or not the model of the virtual space 20 has changed. If the model of the virtual visual space 20 has changed the method moves to block 66. If the model of the virtual visual space 20 has not changed the method moves to block 64.

At block 64 it is determined whether or not the virtual point of view 24 of the virtual user in the virtual visual space 20 has changed. If the virtual point of view 24 of the virtual user has changed the method moves to block 66. If the virtual point of view 24 of the virtual user has not changed the method returns to block 62.

At block 66, a two-dimensional projection of the three-dimensional virtual visual space 20 is taken from the location 23 and in the direction 25 defined by the current virtual point of view 24 of the virtual user. The projection is limited by the field of view 26 to produce the virtual visual scene 22. The projection may also define the sound scene. The method then returns to block 62.

Figure 6B:
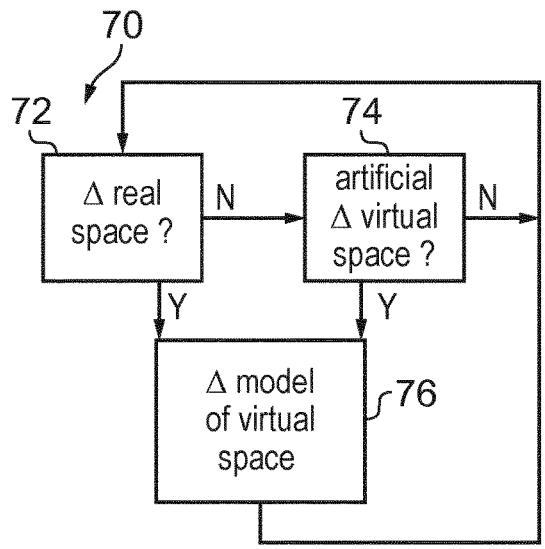
FIG. 6B illustrates an example of a method for updating a model of the virtual visual space for augmented reality.

FIG. 6B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in the FIGS. 6A & 6B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Figure 7A:
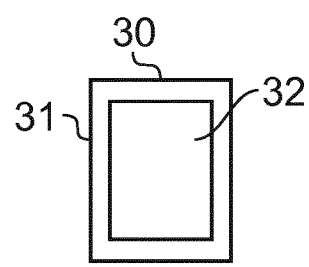
FIGS. 7A and 7B illustrate examples of apparatus that enable display of at least parts of the virtual visual scene to a user.
Figure 7B:
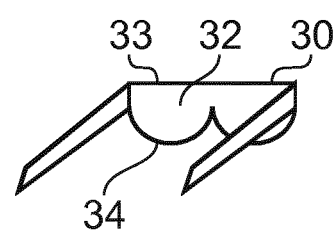

FIGS. 7A and 7B illustrate examples of apparatus 30 that enable display of at least parts of the virtual visual scene 22 to a user and rendering of audio to a user.

FIG. 7A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30. The handheld apparatus 31 may house the sensors 45 for determining changes in the real point of view from a change in a user controlled device such as, for example, actuation of buttons, virtual buttons, slider, joystick, etc. The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 7B illustrates a head-mounted apparatus 33 comprising a display 32 and/or audio output 32 that renders content to a user. The head-mounted apparatus 33 may be moved automatically when a head of the user moves.

A head-mounted apparatus 33 comprising a display 32 may be referred to as a head-mounted display (HMD) device.

A head-mounted apparatus 33 comprising an audio output 32 (e.g. a loudspeaker) may be referred to as a head-mounted audio (HMA) device.

The head-mounted apparatus 33 may house the sensors 44 (not illustrated) for point of view detection that detect a location and orientation of the apparatus 33 or an orientation of the apparatus 33.

The head-mounted apparatus 33 may house the sensors 45 (not illustrated) for gaze direction detection and/or selection gesture detection.

The head-mounted apparatus 33 may be a see-through HMD arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Referring back to FIG. 5, an apparatus 30 may enable user-interactive mediation for mediated reality and/or augmented reality and/or virtual reality. The input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or image sensors 47 may be used to detect movement of parts of a user 18 and/or positional/movement sensors attached to a limb of a user 18 may be used to detect movement of the limb.

Object tracking may be used to determine when an object or user changes or moves. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in action recognition.

Figure 8A:
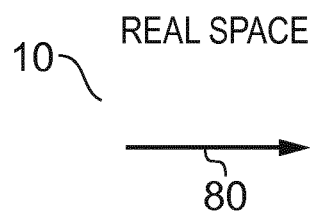
FIG. 8A, illustrates an example of a gesture in real space

Referring to FIG. 8A, a particular user action 80 in the real space 10 may be an action user input used as a 'user control' event by the controller 42 to determine what happens within the virtual visual space 20. An action user input is a user action 80 that has meaning to the apparatus 30 as a user input.

Figure 8B:
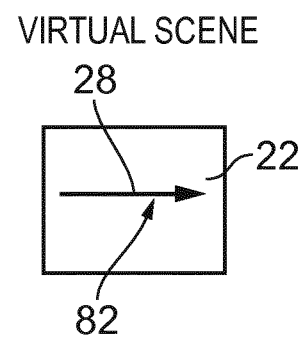
FIG. 8B, illustrates a corresponding representation rendered, in the virtual visual scene, of the gesture in real space.

Referring to FIG. 8B, illustrates that in some but not necessarily all examples, a corresponding representation of the user action 80 in real space is rendered in the virtual visual scene 22 by the apparatus 30. The representation involves one or more visual elements 28 moving 82 to replicate or indicate the user action 80 in the virtual visual scene 22.

A user action 80 may be static or moving. A moving user action may comprise a movement or a movement pattern comprising a series of movements. For example it could be a reaching or grabbing action. For example, it could be making a circling motion or a side to side or up and down motion or the tracing of a sign in space. A moving user action may, for example, be an apparatus-independent action or an apparatus-dependent action. A moving user action may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A user action 80 may be a non-contact user action. A non-contact user action does not contact the sensors at any time during the user action.

A user action 80 may be an absolute action that is defined in terms of an absolute displacement from the sensors. Such a user action may be tethered, in that it is performed at a precise location in the real space 10. Alternatively a user action 80 may be a relative action that is defined in terms of relative displacement during the user action. Such a user action may be un-tethered, in that it need not be performed at a precise location in the real space 10 and may be performed at a large number of arbitrary locations.

A user action 80 may be defined as evolution of displacement, of a tracked point relative to an origin, with time. It may, for example, be defined in terms of motion using time variable parameters such as displacement, velocity or using other kinematic parameters. An un-tethered action may be defined as evolution of relative displacement Δd with relative time Δt.

A user action 80 may be performed in one spatial dimension (1D action), two spatial dimensions (2D action) or three spatial dimensions (3D action).

The user action 80 may be a gesture.

Figure 9A:
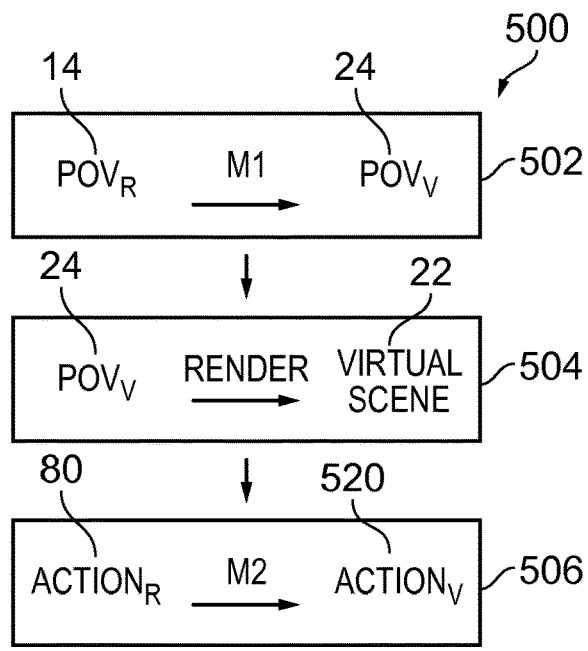
FIG. 9A illustrates an example of a method 500 for enabling mediated reality.

FIG. 9A illustrates an example of a method 500 for enabling mediated reality.

The method 500 comprises, at block 502, using a tracked real point of view 14 of a user 18 in a real space 10 and a first mapping M1 between the real space 10 and a virtual space 20, 92 to determine a point of view 24 of a virtual user 16 within the virtual space 20,92.

The first mapping M1 is a point of view (POV) mapping as it maps a real point of view 14 of a user 18 in a real space 10 to a point of view 24 of a virtual user 16 within the virtual space 20,92.

The method 500 comprises, at block 504, causing rendering to the user 18 of at least part of a virtual scene 22 determined by the point of view 24 of the virtual user 16 within the virtual space 20,92.

The method 500 comprises, at block 506, using a selected one of a plurality of different mappings, the second mapping M2 in this example, to map tracked user actions 80 in the real space 10 to actions 520 of the virtual user 16 in the virtual space 20, 92.

The selected mapping M2 is an action mapping as it maps tracked user actions 80 of a user 18 in a real space 10 to actions 520 of a virtual user 16 within the virtual space 20,92.

Figure 9B:
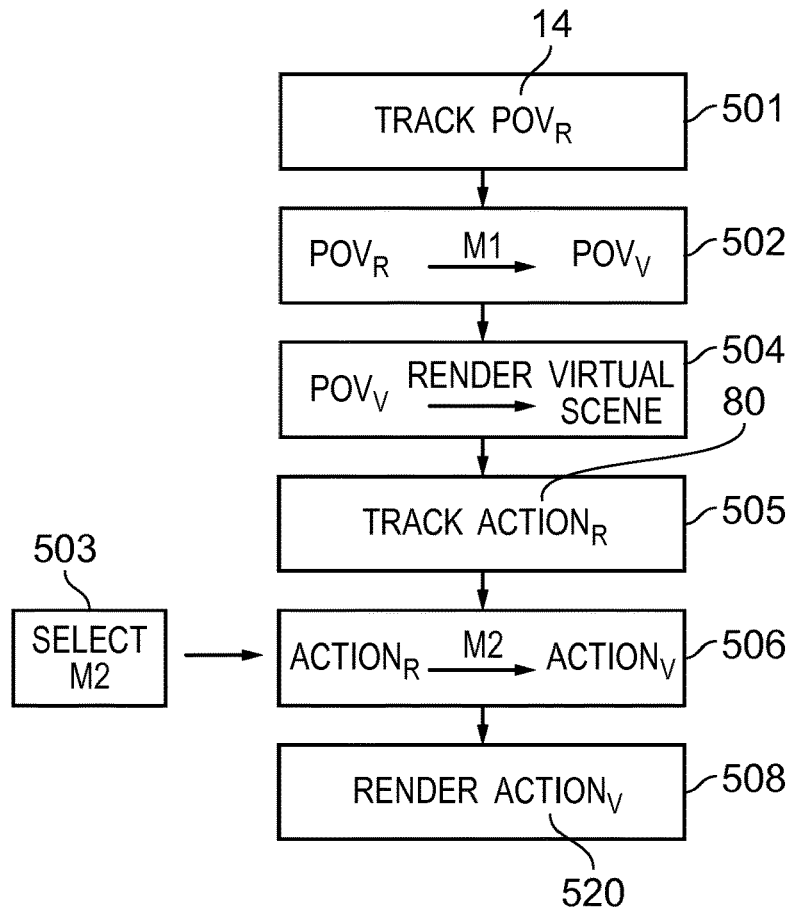
FIG. 9B illustrates an example of a method 500 that is similar to the method illustrated in FIG. 9A.

FIG. 9B illustrates an example of a method 500 that is similar to the method illustrated in FIG. 9A.

In this example of the method 500, but not necessarily all examples of the method 500, the method 500 comprises, at block 501, tracking a real point of view 14 of the user 18 in the real space 10 to enable first person perspective-mediated mediated reality and/or, at block 505, tracking user actions 80 to enable interaction between the virtual user 16 and virtual objects 28 in the virtual space 20, 92.

The block 501 is performed before block 502. The block 505 is performed before block 506.

In this example of the method 500, but not necessarily all examples of the method 500, the method 500 comprises, at block 503, selecting one of a plurality of different mappings to map tracked user actions.

Selection of the action mapping M2 therefore allows the action mapping to be independent of the POV mapping M1.

In this example of the method 500, but not necessarily all examples of the method 500, the method additionally comprises at block 510 causing rendering to the user 18 of a representation of the actions 520 of the virtual user 16 in at least the virtual visual space 20.

FIG. 10A illustrates an example of a POV mapping. It illustrates the consequences of blocks 502 and 504 of the method 500 in respect of a virtual visual scene 20.

A tracked real point of view 14 of a user 18 in a real space 10 and a POV mapping M1 between the real space 10 and a virtual visual space 20 are used to determine a point of view 24 of a virtual user 16 within the virtual visual space 20. At least part of the virtual visual scene 22 rendered to the user 18 is determined by the point of view 24 of the virtual user 16 within the virtual visual space 20.

FIG. 10B illustrates an example of an action mapping. It illustrates the consequences of block 506 of the method 500 in respect of a virtual visual scene 20.

A second mapping M2, is selected from a plurality of different mappings {M} and is used to map tracked user actions 80 in the real space 10 to actions 520 of the virtual user 16 in the virtual visual space 20. A representation of the actions 520 of the virtual user 16 may be rendered in the virtual visual space 20.

The user actions 80 may be as previously described. In some but not necessarily all examples, the user actions comprise movement of a limb, for example a hand, relative to a body of the user.

FIG. 11 illustrates an example of different modes of operation—including a first mode 531 and a second mode 532. Other examples are possible.

In the first mode 531, a tracked real point of view 14 of a user 18 in a real space 10 and a POV mapping M1 between the real space 10 and a virtual visual space 20 are used in method 500 to determine a point of view 24 of a virtual user 16 within the virtual visual space 20. At least part of the virtual visual scene 22 rendered to the user 18 is determined by the point of view 24 of the virtual user 16 within the virtual visual space 20. The first mapping M1 that was used as the POV mapping is also used as the action mapping to map tracked user actions 80 in the real space 10 to actions 520 of the virtual user 16 in the virtual visual space 20. A representation of the actions 520 of the virtual user 16 may be rendered in the virtual visual space 20.

In the second mode 532, a tracked real point of view 14 of a user 18 in a real space 10 and a POV mapping M1 between the real space 10 and a virtual visual space 20 are used in method 500 to determine a point of view 24 of a virtual user 16 within the virtual visual space 20. At least part of the virtual visual scene 22 rendered to the user 18 is determined by the point of view 24 of the virtual user 16 within the virtual visual space 20. The first mapping M1 that was used as the POV mapping is not also used as the action mapping to map tracked user actions 80 in the real space 10 to actions 520 of the virtual user 16 in the virtual visual space 20. A second mapping M2, different to the first mapping, is used as the action mapping to map tracked user actions 80 in the real space 10 to actions 520 of the virtual user 16 in the virtual visual space 20. A representation of the actions 520 of the virtual user 16 may be rendered in the virtual visual space 20.

The mappings M are spatial mappings that map real space to virtual space. Each mapping maps an orientation in real space 10 to an orientation in virtual space 20 and maps a location in real space 10 to a location in virtual space 20. Each mapping maps a change in orientation in real space 10 to a change in orientation in virtual space 20 and a change in location (a displacement) in real space 10 to a change in location (a displacement) in virtual space 20.

The first mapping M1, in some but not necessarily all examples, is one-to-one scale mapping between orientation in real space 10 and orientation in virtual space 20 and a one-to-one scale mapping between displacement in real space 10 and displacement in virtual space 20.

Thus, when the first mode is selected, the method comprises mapping tracked user actions 80 in the real space 10, using the first mapping M1, to spatially-equivalent actions 520 of the virtual user 16 in the virtual space.

The second mapping M2, in some but not necessarily all examples, is one-to-one scale mapping between orientation in real space and orientation in virtual space and is a greater than one-to-one scale mapping between displacement in real space and displacement in virtual space. The greater than one-to-one scale mapping may be fixed, variable or intelligently adaptable.

Thus, when the second mode is selected, the method 500 comprises mapping tracked user actions 80 in the real space 10, using the second mapping M2, to spatially-non-equivalent actions 520 of the virtual user 16 in the virtual space 20. Thus user actions 80 in the real space 10 result in actions 520 in the virtual space 20 that are amplified in extent but not direction for the second mapping (second mode) compared to the first mapping (first mode).

The one-to-one scale mapping between orientation in real space and orientation in virtual space, the POV mapping, is the same for the first mode and the second mode.

The mapping between displacement in real space 10 and displacement in virtual space 20, the action mapping, is different between the first mode 531 and the second mode 532.

Thus, when the second mode is selected, the method comprises mapping tracked user actions 80 in the real space, using a second mapping M2 different to the first mapping M1, to non-spatially-equivalent actions 520 of the virtual user 16 in the virtual space 20.

The plurality of mappings may include the first mapping M1 and the second mapping M2. In some but not necessarily all examples, the plurality of mapping may comprise additional different mappings and the action mapping in the second mode 532 may be selected from those different mappings.

In some but not necessarily all examples, whether the first mode 531 or the second mode 532 is operative in respect of a user's actions 80 depends upon actual or predicted user actions of the user 18 in the real space 10. Thus the selection of which one of the plurality of mappings is used is dependent upon an actual or predicted user action in the real space 10.

In some but not necessarily all examples, whether the first mode 531 or the second mode 532 is operative in respect of a user's actions 80 depends upon actual or predicted location of the user 18 in the real space 10. Thus the selection of which one of the plurality of mappings is used is dependent upon an actual or predicted location of the user in the real space 10.

In some but not necessarily all examples, reachability problems may be detected or predicted from actual or predicted user actions in the real space 10. A transition from the first mode 531 to the second mode 532 may occur to address the reachability problem The action mapping M2 may be selected to provide a reach to the virtual user 16 in the virtual space 20 that would be impossible for the user 18 in the real space 10.

The switching from the first mapping 531 to the second mapping 532 for mapping the user actions 80 may occur in response to an extended reach by the user 18 in the real space 10 and/or a reach by the user 18 in the real space 10 into a designated zone. An extended reach by a user is a reach that extends beyond a threshold value from the user. It is an unusually extended reach. The threshold value may be based upon an average for that user or may be a fixed value.

The extended reach 520 provided to the virtual user 16 by the action mapping M2 may be dependent upon a direction of that reach. The distance, speed, or acceleration of a reach may, for example, vary with direction. The direction of reach may be determined in two dimensions or three dimensions.

Figure 12:
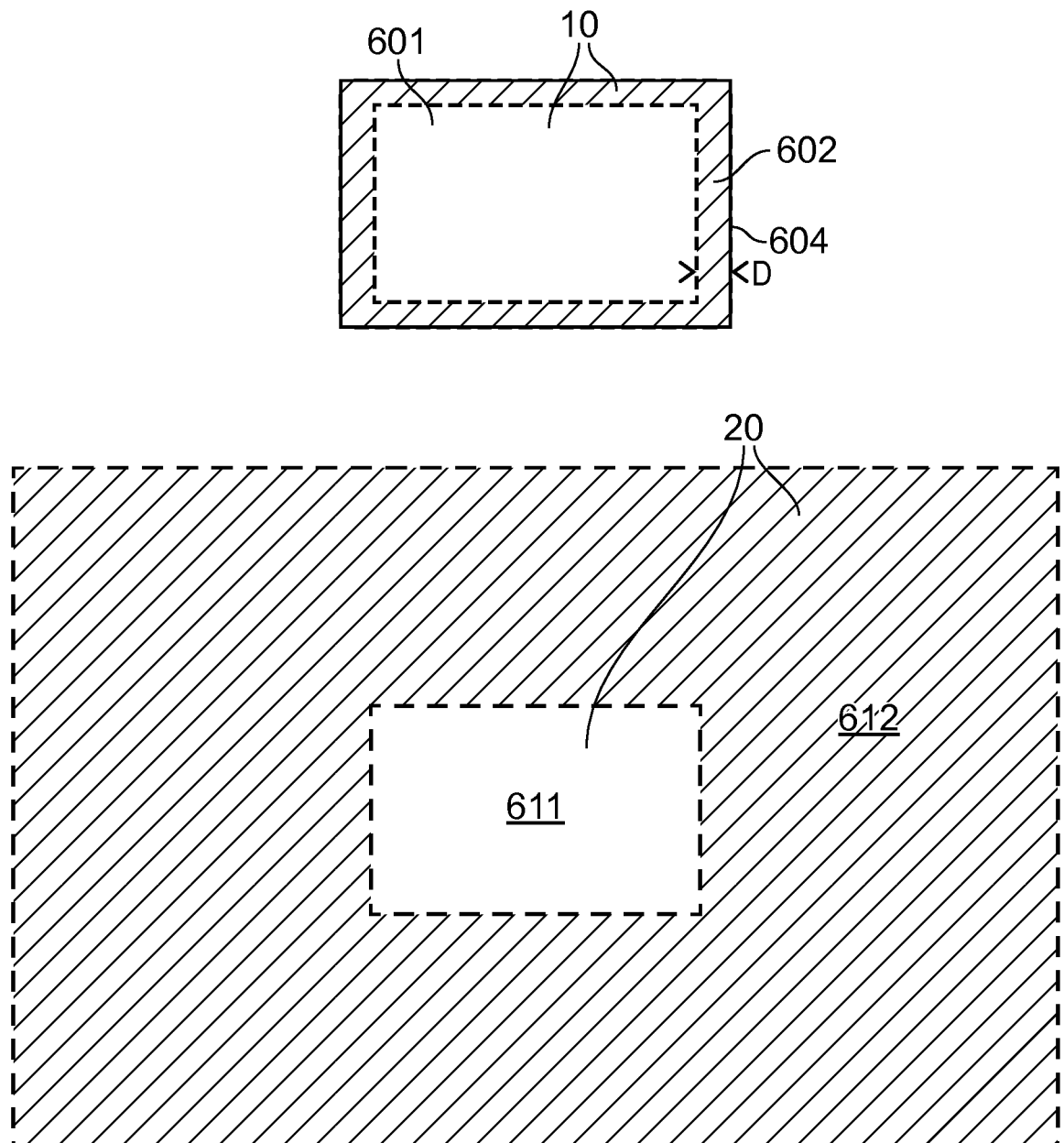
FIG. 12 illustrates an example in which the switching the action mapping occurs in response to a reach by the user in the real space into a designated zone of the real space.

FIG. 12 illustrates an example in which the switching from the action mapping M1 to the action mapping M2 for mapping the user actions 80 to virtual user actions 520 occurs in response to a reach 80 by the user 18 in the real space 10 into a designated zone 602 of the real space 10.

In this example but not necessarily all examples, the designated zone 602 is adjacent a boundary 604 of the real space 10. A boundary may, for example, be a hard boundary defined by a solid real object or a perimeter defined by the walls of a room occupied by the user. The designated zone 602 may extend for a defined distance D from the boundary 604, for example a length of the user's arm or a length of a typical user's arm or greater than a length of the user's arm or a length of a typical user's arm.

The real space 10 comprises a first zone 601 that is associated with the action mapping M1 and a second zone 602 associated with the action mapping M2.

Figure 13A:
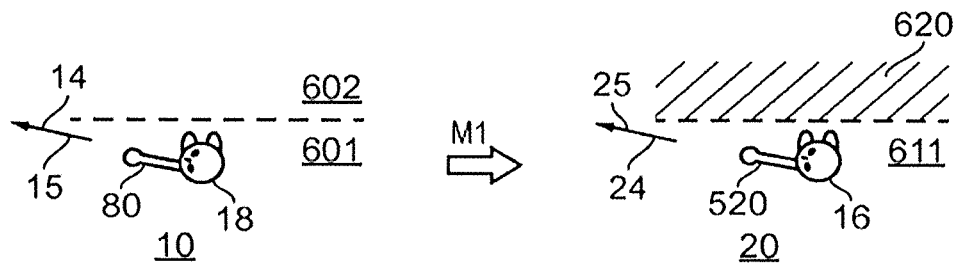
FIG. 13A illustrates an example of a user in the real space making a reach during the first mode.

When the user 18 is located within the first zone 601 but does not reach into the second zone 602, the action mapping M1 is used to map tracked user actions 80 in the real space 10 to actions 520 of the virtual user 16 in a first zone 611 of the virtual space 20. An example of this is illustrated in FIG. 13A.

When the user 18 reaches into the second zone 602, the action mapping M2 is used to map tracked user actions 80 in the real space 10 to actions 520 of the virtual user 16 in a second zone 612 of the virtual space 20. An example of this is illustrated in FIG. 13B.

Figure 13B:
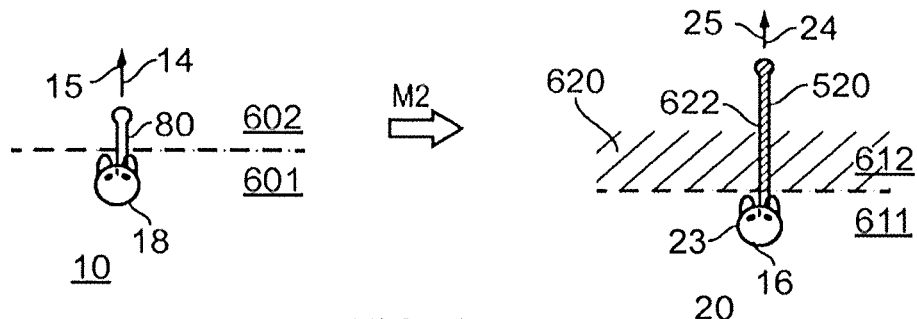
FIG. 13B illustrates an example of a user in the real space making a reach during the second mode

The user 18 reaches 80 into the second zone 602 triggering a switch from the first mode (FIG. 13A) to the second mode (FIG. 13B).

The location 13 of the user 18 remains outside the second zone 602 of the real space 10 while the user 18 reaches into the second zone 602 of the real space 10. The location 23 of the virtual user 16 remains outside the second zone 612 of the virtual space 20 while the virtual user 16 reaches into the second zone 612 of the virtual space 20.

In some but not necessarily all examples, the first mode and the second mode have the same equivalent mapping of changes in orientation 15 of the user 18 in the real space 10 to changes of orientation 25 of the virtual user 16 within the virtual space, In some but not necessarily all examples, the first mode equivalently maps changes in displacement of the user 18 in the real space 10 to changes in displacement of the virtual user 16 within the virtual space 20, providing for reach 520 within the virtual space 20 equivalent to a reach 80 within the real space 10 (FIG. 13A).

In some but not necessarily all examples, the second mode non-equivalently maps changes in displacement of a user action 80 in the real space 10 to changes in displacement of the virtual user action 520 within the virtual space 20, providing for a reach 520 within the virtual space 20 in excess of (longer than) a reach 80 within the real space 10 (FIG. 13B).

The change in mode from the first mode to the second mode and the action mapping M2 makes available a second zone 612 of the virtual space 20 not available in the first mode using the action mapping M1.

The change in mode from the first mode to the second mode and the action mapping M2 makes available user interactions 520 within a zone 612 of the virtual space 20 unavailable in the first mode using the action mapping M1.

The change in mode from the first mode to the second mode and the action mapping M2 makes available virtual objects 21 for interaction within a zone 612 of the virtual space 20 that are unavailable in the first mode using the first mapping M1.

The first zone 601 of the real space 10 and the second zone 602 of the real space 10 are non-overlapping and contiguous. The first zone 611 of the virtual space 20 and the second zone 612 of the virtual space 20 are non-overlapping, they may or may not be contiguous In some examples, the mediated reality content is adapted to make an object more accessible. This may, for example, occur automatically for the nearest interactive object. This may, for example, occur automatically for the nearest interactive object that is outside the first zone 611 of the virtual space 20. This increased accessibility can involve changing a relative spatial relationship between the virtual object and the virtual user e.g. changing relative virtual object-virtual user location. This increased accessibility can involve exposing a target virtual object by removing virtual objects that intervene between the target virtual object and the virtual user 16.

In some but not necessarily all examples, the second zone 612 of the virtual space 20 is rendered as a two-dimensional projection onto virtual surfaces within the rendered virtual visual scene 22 at a position of the outer boundary of the first zone 601 in real space (zone 611 in virtual space) or the outer boundary 604 of the real space. The first zone 611 of the virtual space 20 in front of the second zone 612 of the virtual space may rendered in three-dimensions.

In some but not necessarily all examples, the tracked real point of view 14 of a user 18 in a real space 10 depends not only upon a tracked orientation 15 of the user 18 but also on a tracked location 13 of the user 18 (see FIG. 3A). There are 6 degrees of freedom (6 DoF) for three dimensional orientation and three dimensional location. A change in location 13 of the user 18 within the first zone 601 of the real space is mapped using the mapping M1 to a change in virtual location 23 of the virtual user 16 within the first zone 611 of the virtual space 20. In some of these examples, a change in location 13 of the user 18 from the first zone 601 of the real space into the second zone 602 of the real space 10 is mapped using a mapping different to the mapping M1 (e.g. the mapping M2) to a change in virtual location 23 of the virtual user 16. In other examples, a change in location 13 of the user 18 from the first zone 601 of the real space into the second zone 602 of the real space 10 is not mapped and does not change a virtual location 23 of the virtual user 16. Thus the first zone 611 may enable virtual user movement (re-positioning of location) and virtual user actions, whereas the second zone 612 may enable extended user actions 520 but not virtual user movement (re-positioning of location).

In other examples, the tracked real point of view 14 of a user 18 in a real space 10 depends only upon a tracked orientation 15 of the user 18 and does not depend on a location 13 of the user 18. There are 3 degrees of freedom (3DoF) for three dimensional orientation. A change in location 13 of the user 18 within the first zone 601 of the real space is not mapped using the mapping M1 to a change in virtual location 23 of the virtual user 16 within the first zone 611 of the virtual space 20. In this scenario, the first zone 601 may be limited to the location of the user 18 in the real space 10.

Referring to FIGS. 13A and 13B, the selected action mapping M2 provides for extending a reach of the virtual user 16. The first mode (FIG. 13A) provides via the action mapping M1 a normal reach 520 to the virtual user 16 in response to a normal reach 80 by the user 18 in the real space 10 and the second mode (FIG. 13B) provides via the action mapping M2 an extended reach 520 to the virtual user 16 in response to a normal reach 80 by the user 18 in the real space 10.

In some but not necessarily all examples, the designated zone 602 is mapped using the first mapping M1 to a virtual designated zone 612 in the virtual visual space 20 that is highlighted 620 to the user within the virtual visual scene 20 (FIGS. 13A, 13B).

In some but not necessarily all examples, the selected second mapping M2 provides an extended reach to the virtual user 16 to at least the nearest interactive virtual object 21 in a virtual direction of reach. The virtual direction of reach is determined by the first mapping and the real direction of the user's reach.

An extent of the reach may be automatically adjusted to the distance of a target interactive object. A virtual object may be targeted by a virtual direction of reach 520 that is determined by the POV mapping M1 and the real direction of the user's reach 80.

In some but not necessarily all examples, the switching from the action mapping M1 to the action mapping M2 for mapping the user actions 80 to virtual user actions 520 is highlighted 622 visually to the user 18 within the virtual scene 20. In this example, but not necessarily all examples, a virtual hand and/or arm of the virtual user 16 rendered in the virtual scene 20 has a different appearance 622 when rendered within the second zone 612 compared to the first zone 611.

Figure 14:
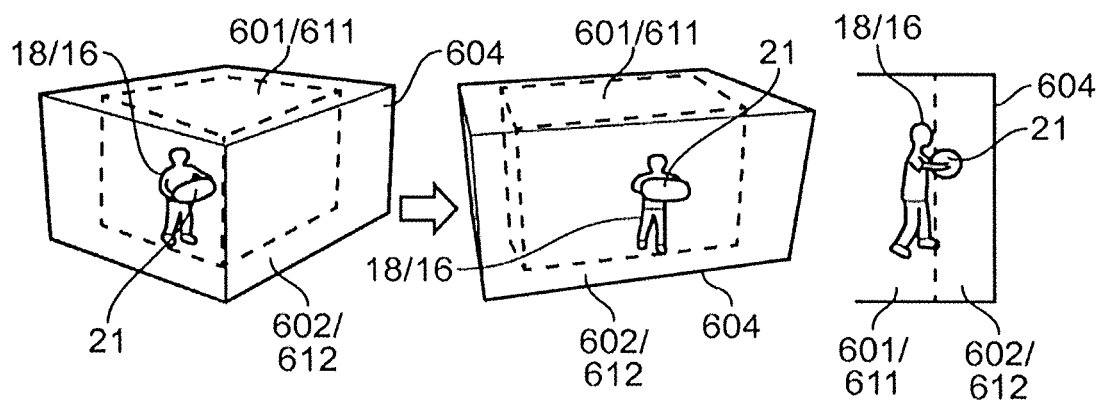
FIG. 14 illustrates an example in which a user reaches outside a first zone and into a second zone to change modes.

FIG. 14 illustrates an example in which a user 18 moves to a boundary 604, reaches outside the first zone 601 and into the second zone 602. Simultaneously, the virtual user 16 moves and reaches outside the first zone 611 into the second zone 612.

In this example, the user actions 80 in the real space 10 have equivalent actions in the virtual space 20. The virtual user 18 is able to move a virtual object 21.

The virtual object 21 is moved to a boundary of the first zone 611. The virtual user 16 then reaches out with the virtual object 21 into the second zone 612. The second mode starts. The second mode and the action mapping M2 allows the virtual user 18 to move the virtual object to a zone 612 of the virtual space 20 that is unavailable in the first mode that uses a different action mapping.

Although this example, illustrates a virtual user 18 moving a virtual object 21 from the first zone 611 into the second zone 612, in other examples, the virtual user moves a virtual object 21 into the first zone 611 from the second zone 612, and in other examples, the virtual user moves or interacts with a virtual object 21 within the second zone 612.

The selected action mapping M2 can therefore be used to map tracked user actions 80 in the real space 10 to actions of the virtual user 16 in the virtual space 20 to move an object to, within or from a zone 612 of the virtual space 20 that is unavailable using the action mapping M1.

This example also illustrates the real space 10; zones 601, 602; virtual space 20; zones 611, 612; points of view 14, 26; user actions 80 and virtual user actions 520 can be three dimensional. The previous examples, illustrated in two-dimensions are also applicable to three-dimensions.

Figure 15A:
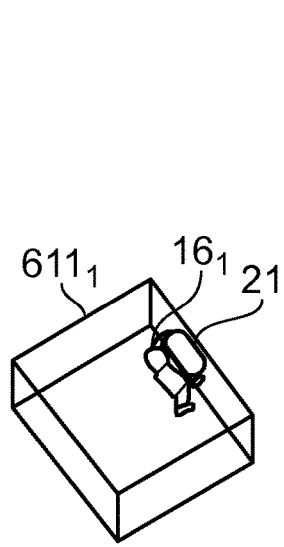
FIGS. 15A-15B illustrates an example in which a user reaches outside a first zone and into a second zone not occupied by another user causing the virtual user to reach outside a first zone into a second zone occupied by another virtual user.
Figure 15B:
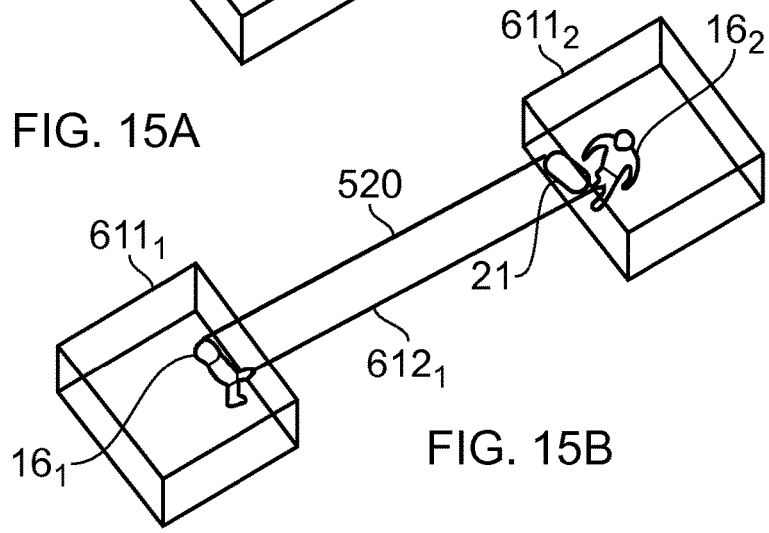

FIGS. 15A and 15B illustrate an example of how a transition from the first mode to the second mode in respect of a first virtual user $16_1$ is triggered by a first user $18_1$ causing the first virtual user $16_1$ to reach 520 outside a first zone $611_1$ of the first virtual user $16_1$. The transition to the second mode allows the first virtual user $16_1$ to have an extended reach 520 outside the first zone $611_1$ of the first virtual user $16_1$ into a first zone $611_2$ of a second virtual user $16_2$. In this case, the extended reach 520 is used to deliver a virtual object 21. The second zone $612_1$ for the first virtual user $16_1$ extends at least partially into the first zone $611_2$ of the second virtual user $16_2$.

It is also possible for a transition from the first mode to the second mode in respect of a second virtual user $16_2$ to be triggered simultaneously by a second user $18_2$ causing the second virtual user $16_2$ to reach outside a first zone $611_2$ of the second virtual user $16_2$. The transition to the second mode allows the second virtual user $16_2$ to have an extended reach outside the first zone $611_2$ of the second virtual user $16_2$ towards the extended reach of the first virtual user $16_2$.

The extended reach 520 of either virtual users may be used to deliver or simultaneously interact with a virtual object 21. The extended reach 520 of the first virtual user $16_1$ may be of an extent to reach the second virtual user $16_2$ or an extended reach of the second virtual user $16_1$ and may be used to deliver or simultaneously interact with a virtual object 21.

The extended reach 520 of the first virtual user $16_1$ may be rendered to the first user $18_1$. The extended reach 520 of the first virtual user $16_1$ may be rendered to the second user $18_2$.

The second virtual user $16_2$ and/or the extended reach of the second virtual user $16_2$ may be rendered to the first user $18_1$ and the second user $18_2$.

The extended reach 520 of both virtual users may be used to deliver or simultaneously interact with a virtual object 21. This interaction may be visible to both the first user $18_1$ and the second user $18_2$. The second zone $612_1$ for the first virtual user $16_1$ and the second zone for the second virtual user $16_2$ overlap.

When the first virtual user $16_1$ reaches 520 outside the first zone $611_1$ of the first virtual user $16_1$ towards the second virtual user $16_2$, a highlight or other interrupt may be generated so that the second user $18_2$ is aware of the possibility of mutual interaction between the first virtual user $16_1$ and the second virtual user $16_2$. The highlighting may, for example, indicate that an interaction is possible and a direction for that interaction and/or indicate what type of interaction is possible and/or indicate with whom or with what the interaction is possible.

In one use case, two users, S and A, are consuming a common 6 degree of freedom (6DoF) mediated reality content with various audio-visual objects. S and A currently consume a different part of the common (shared) mediated reality content. S and A are in different rooms, perhaps separated by a large distance and have distinct real spaces 10 that do not overlap. The respective first zones 611 do not overlap in the virtual space 20,92 and there may be a significant distance between the virtual locations of the first zones 611. Virtual S and virtual A (and therefore S and A) may, however, see each other in the virtual space 20 via the rendered mediated reality content.

S has found an interesting virtual audio-visual object 21, which he interacts with. For example, he may study parts of the virtual object 21 or modify it in some way. He wants A to take part in the interaction. He decides to use the second zone 602 of his real space 10 and the second zone 612 in the virtual space 20 to enable interaction-at-a-distance.

In real space 10, S moves from a central location of the first zone 601 of his real space 10, where he has initiated the interaction, while performing the gesture of carrying an object. He moves towards a boundary 604 of his real space 10 where he may access the second zone 602. In virtual space 20, virtual S moves from a central location of the first zone 601 of the virtual space 20, where he has initiated the interaction, while carrying the virtual object, towards the second zone 612.

In real space 10, S reaches out into the second zone 602 while performing the gesture of carrying an object. In virtual space 20, virtual S reaches out into the second zone 612 while carrying the virtual object 21. This changes modes, allowing S to have an extended reach.

S may place the audio-visual object 21 in the second zone 612, for example, where it may be more visible and accessible to virtual A (and hence A).

S may alternatively place the audio-visual object 21 in the first zone 611 of A.

The extent to which S can move and interact with virtual objects may be permission dependent. The permissions may vary based on the mediated reality content, the virtual object, an identity of the person initiating the interaction, an identity of a person who is a target for interaction (if any).

FIGS. 16A-16F illustrate different arrangements of a first zone $611_1$ of a first virtual user and a first zone $611_2$ of a second virtual user.

A second zone 612 of the first virtual user is outside the first zone $611_1$ of the first virtual user.

A second zone 612 of the second virtual user is outside the first zone $611_2$ of the second virtual user.

Figure 16A:
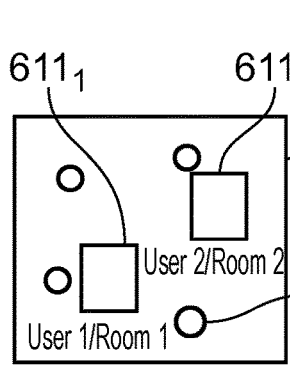
FIGS. 16A-16F illustrate different arrangements of a first zone of a first virtual user and a first zone of a second virtual user.
Figure 16B:
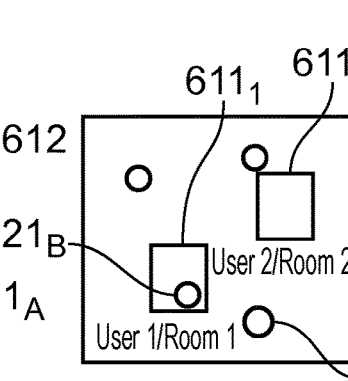
Figure 16C:
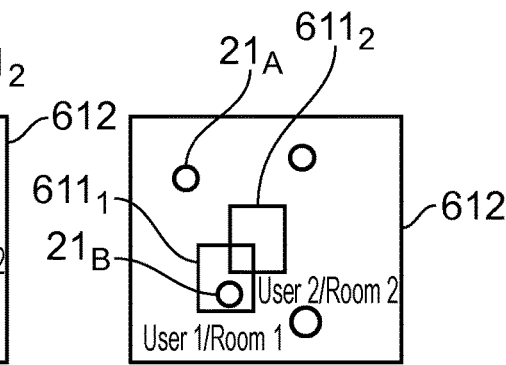
Figure 16D:
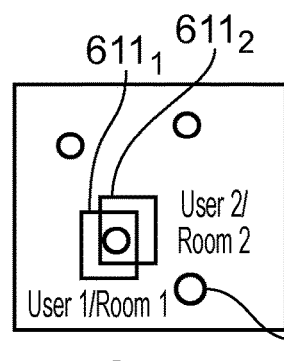
Figure 16E:
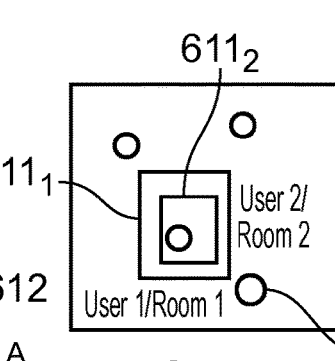
Figure 16F:
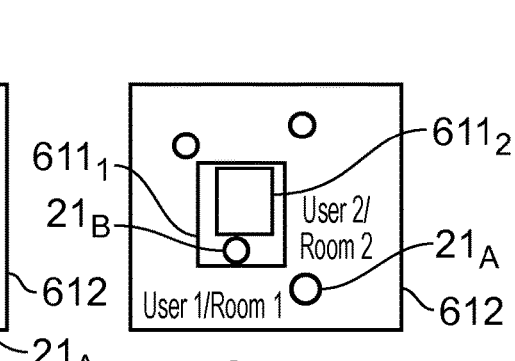

The first zone $611_1$ of the first virtual user and the first zone $611_2$ of the second virtual user may be distinct (FIGS. 16A, 16B), may partially overlap (FIGS. 16C, 16D) or may wholly overlap (FIGS. 16E, 16F).

A virtual object 21A, suitable for mutual interaction, simultaneously, by the first virtual user and the second virtual user may be outside both first zones $611_1$, $611_2$.

A virtual object $21_A$, $21_B$ (FIGS. 16B, 16C, 16F), suitable for mutual interaction, simultaneously, by the first virtual user and the second virtual user may be outside at least one of the first zones $611_1$, $611_2$. The virtual object $21_B$ (FIGS. 16B, 16C, 16F), suitable for mutual interaction, simultaneously, by the first virtual user and the second virtual user is outside one of the first zones $611_1$, $611_2$ but inside the other.

Thus a virtual object 21, suitable for mutual interaction, simultaneously, by the first virtual user and the second virtual user may be outside both first zones $611_1$, $611_2$ (FIG. 16A), inside one first zone and outside the other first zone (FIGS. 16B, 16C, 16F) or inside both first zones $611_1$, $611_2$ (FIGS. 16D, 16E).

The creation of a second zone 612 creates a common zone accessible to both the first virtual user and the second virtual user if not previously available. A second zone 612 of the first virtual user may overlap at least a part of a first zone $611_2$ of the second virtual user. A second zone 612 of the second virtual user may overlap at least a part of a first zone $611_1$ of the first virtual user. A second zone 612 of the first virtual user may overlap at least a part of a second zone 612 of the second virtual user.

In some, but not necessarily all examples, a second zone 612 may be limited and exist only in a space determined by the relative virtual locations of the virtual users 16. For example, it may exist only in the space between virtual users or only in a space that is visible to the users.

It should be appreciated that while the above multi-user examples, have used only two users, it is possible for the group of multiple users who interact to be greater than two.

Where the second zone 612 is limited and exists only in a space determined by the relative virtual locations of the virtual users 16, then the second zone 612 varies with the composition of the group of virtual users and the virtual users' locations.

The method 500 can therefor allow for interaction between a group of users when the first zones 611 for those users do not mutually overlap, without the need to change or move the first zones 611 so that there is mutual overlap.

From the foregoing, it will be appreciated that at least some examples of the method 500 comprises:

detecting an interrupt (trigger) during rendering to a user at least part of a virtual scene 22 determined by a point of view 24 of a virtual user 16 within a virtual space 20, wherein the point of view 24 of the virtual user 16 within the virtual space 20 is determined by a tracked real point of view 14 of the user 18 in a real space 10 and a first mapping M1 between the real space 10 and the virtual space 20 and wherein the first mapping M1 is used to map tracked user actions 80 in the real space 10 to actions 520 of a virtual user 16 in the virtual space 20;

in response to the interrupt (trigger), automatically causing use of a second mapping M2 between the real space 10 and the virtual space 10 to map tracked user actions 80 in the real space 10 to actions 520 of a virtual user 16 in the virtual space 20 while causing rendering to the user 18 at least part of a virtual scene 22 determined by the point of view 24 of the virtual user 16 within the virtual space 20, wherein the point of view 24 of the virtual user 20 within the virtual space 20 is determined by the tracked real point of view 14 of the user 18 in the real space 10 and the first mapping M1. This implementation of the method is particularly suitable for use as a service run on a remote server.

From the foregoing, it will be appreciated that the apparatus 30 can comprise:

at least one processor 40; and at least one memory 46 including computer program code 48 the at least one memory 46 and the computer program code 48 configured to, with the at least one processor 40, cause the apparatus 30 at least to perform:

causing use of a tracked real point of view of a user in a real space and a first mapping between the real space and a virtual space to determine a point of view of a virtual user within the virtual space;

causing rendering to the user at least part of a virtual scene determined by the point of view of the virtual user within the virtual space; and causing use of a selected one of a plurality of different mappings to map tracked user actions in the real space to actions of the virtual user in the virtual space.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated in FIG. 5 as a single component/circuitry it may be implemented as one or more separate components/circuitry some or all of which may be integrated/removable and/or may provide permanent/semi-permanent/dynamic/cached storage.

Although the processor 40 is illustrated in FIG. 5 as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the Figs, particular FIGS. 9A and 9B, may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The method 500 may be performed by the apparatus 30, for example as previously described in relation to FIG. 5, 6A or 6B, the controller 42 of the apparatus 30 or the computer program 48. The apparatus 30 may a self-contained apparatus that performs all necessary functions itself or may be part of a system and delegate certain functions to other apparatuses or services.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I/We claim:
1. An apparatus comprising:
at least one processor; and
at least one non-transitory memory including computer program code,
the at least one memory and the computer program code configured to, with the at least one processor, cause the apparatus to perform at least:
use a tracked real point of view of a user in a real space and a first mapping between the real space and a virtual space to determine a point of view of a virtual user within the virtual space;
cause rendering to the user at least part of a virtual scene determined with the point of view of the virtual user within the virtual space; and
use a selected one of a plurality of different mappings to map tracked user actions in the real space to actions of the virtual user in the virtual space;
wherein the apparatus is configured so that, when a first mode is selected, the apparatus maps tracked user actions in the real space, using the first mapping, to spatially-equivalent actions of the virtual user in the virtual space, and
wherein the apparatus is configured so that, when a second mode is selected, the apparatus maps tracked user actions in the real space, using a second mapping different from the first mapping, to non-spatially-equivalent actions of the virtual user in the virtual space, wherein the second mapping makes available user interactions within a zone of the virtual space, the zone of the virtual space being unavailable using the first mapping, wherein a virtual location of the virtual user remains outside the zone of the virtual space while the virtual user reaches into the zone of the virtual space that is unavailable using the first mapping;
wherein a nearest interactive object is within the zone of the virtual space that is unavailable using the first mapping and beyond a boundary defining a first virtual zone of the virtual space that is available using the first mapping and the zone of the virtual space that is unavailable using the first mapping relative to the virtual location of the virtual user.

2. The apparatus of claim 1, wherein the second mapping provides an extended reach to the virtual user to at least the nearest interactive object in a direction of virtual reach and wherein the first mapping does not provide the extended reach to the virtual user to at least the nearest interactive object in the direction of virtual reach.

3. The apparatus of claim 1, wherein the apparatus is configured to select the second mapping from the plurality of mappings in dependence upon actual or predicted changes in a location of the user in the real space.

4. The apparatus of claim 1, wherein the apparatus is configured to switch from the first mode to the second mode in response to at least one of:
an extended reach with the user in the real space that extends beyond a threshold value from the user; or
a reach with the user in the real space into a designated zone.

5. The apparatus of claim 1, wherein the apparatus is configured so that a change in the selected one of the plurality of mappings is highlighted to the user within the virtual scene.

6. The apparatus of claim 1, wherein the real space comprises a first zone and a second, different, zone, wherein
the first zone of the real space is associated with the first mapping, wherein the apparatus is configured so that when the user is located within the first zone but does not reach into the second zone, the first mapping is used to map tracked user actions in the real space to actions of the virtual user in the first virtual zone of the virtual space; and
the second zone of the real space is associated with the second mapping, wherein the apparatus is configured so that when the user reaches into the second zone, the second mapping is used to map tracked user actions in the real space to actions of the virtual user in a second virtual zone of the virtual space.

7. The apparatus of claim 6, wherein the first mapping and the second mapping have an equivalent mapping of changes in orientation of the user in the real space to changes of orientation of the virtual user within the virtual space,
wherein the first mapping equivalently maps changes in displacement of the user in the real space to changes in displacement of the virtual user within the virtual space, providing for reach within the virtual space equivalent to reach within the real space,
wherein the second mapping non-equivalently maps changes in displacement of the user in the real space to changes in displacement of the virtual user within the virtual space, providing for reach within the virtual space in excess of reach within the real space.

8. The apparatus of claim 1,
wherein the tracked real point of view of the user in the real space depends upon a tracked orientation of the user; or
wherein the tracked real point of view of the user in the real space depends upon a tracked orientation of the user and a tracked location of the user, wherein the apparatus is configured so that a change in tracked location of the user within a first zone of the real space is mapped using the first mapping to a change in virtual location of the virtual user within the virtual space.

9. The apparatus of claim 1, wherein the apparatus is configured to use the second mapping to map tracked user actions in the real space to actions of the virtual user in the virtual space to move an object to, within or from the zone of the virtual space that is unavailable using the first mapping.

10. The apparatus of claim 1, wherein the apparatus is further caused to cause rendering to the user of a representation of the actions of the virtual user in at least the virtual space.

11. The apparatus of claim 1, wherein the apparatus is configured to provide user interactive-mediated reality so that user actions at least partially determine what happens within the virtual space.

12. The apparatus of claim 1, configured as a head mounted apparatus.

13. A method comprising:
using a tracked real point of view of a user in a real space and a first mapping between the real space and a virtual space to determine a point of view of a virtual user within the virtual space;
causing rendering to the user at least part of a virtual scene determined with the point of view of the virtual user within the virtual space; and
using a selected one of a plurality of different mappings to map tracked user actions in the real space to actions of the virtual user in the virtual space;

wherein, when a first mode is selected, the method comprises mapping tracked user actions in the real space, using the first mapping, to spatially-equivalent actions of the virtual user in the virtual space, and wherein, when a second mode is selected, the method comprises mapping tracked user actions in the real space, using a second mapping different from the first mapping, to non-spatially-equivalent actions of the virtual user in the virtual space, wherein the second mapping makes available user interactions within a zone of the virtual space, the zone of the virtual space being unavailable using the first mapping, wherein a virtual location of the virtual user remains outside the zone of the virtual space while the virtual user reaches into the zone of the virtual space that is unavailable using the first mapping;

wherein a nearest interactive object is within the zone of the virtual space that is unavailable using the first mapping and beyond a boundary defining a first virtual zone of the virtual space that is available using the first mapping and the zone of the virtual space that is unavailable using the first mapping relative to the virtual location of the virtual user.

14. The method as claimed in claim 13, wherein the second mapping provides an extended reach to the virtual user to at least the nearest interactive object in a direction of virtual reach and wherein the first mapping does not provide the extended reach to the virtual user to at least the nearest interactive object in the direction of virtual reach.

15. The method of claim 13, wherein the method comprises selecting the second mapping from the plurality of mappings in dependence upon actual or predicted changes in a location of the user in the real space.

16. The method of claim 13, wherein the method comprises switching from the first mode to the second mode in response to at least one of:
   an extended reach with the user in the real space that extends beyond a threshold value from the user; or
   a reach with the user in the real space into a designated zone.

17. The method of claim 13, wherein a change in the selected one of the plurality of mappings is highlighted to the user within the virtual scene.

18. The method of claim 13, wherein the real space comprises a first zone and a second, different, zone, wherein
   the first zone of the real space is associated with the first mapping, wherein when the user is located within the first zone but does not reach into the second zone, the first mapping is used to map tracked user actions in the real space to actions of the virtual user in the first virtual zone of the virtual space; and
   the second zone of the real space is associated with the second mapping, wherein when the user reaches into the second zone, the second mapping is used to map tracked user actions in the real space to actions of the virtual user in a second virtual zone of the virtual space.

19. The method of claim 18, wherein the first mapping and the second mapping have an equivalent mapping of changes in orientation of the user in the real space to changes of orientation of the virtual user within the virtual space,
   wherein the first mapping equivalently maps changes in displacement of the user in the real space to changes in displacement of the virtual user within the virtual space, providing for reach within the virtual space equivalent to reach within the real space,
   wherein the second mapping non-equivalently maps changes in displacement of the user in the real space to changes in displacement of the virtual user within the virtual space, providing for reach within the virtual space in excess of displacement of reach within the real space.

20. A non-transitory computer readable medium comprising program instructions stored thereon for performing at least:
   use a tracked real point of view of a user in a real space and a first mapping between the real space and a virtual space to determine a point of view of a virtual user within the virtual space;
   cause rendering to the user at least part of a virtual scene determined with the point of view of the virtual user within the virtual space; and
   use a selected one of a plurality of different mappings to map tracked user actions in the real space to actions of the virtual user in the virtual space;
   wherein, when a first mode is selected, tracked user actions in the real space are mapped, using the first mapping, to spatially-equivalent actions of the virtual user in the virtual space, and
   wherein, when a second mode is selected, tracked user actions in the real space are mapped, using a second mapping different from the first mapping, to non-spatially-equivalent actions of the virtual user in the virtual space, wherein the second mapping makes available user interactions within a zone of the virtual space, the zone of the virtual space being unavailable using the first mapping, wherein a virtual location of the virtual user remains outside the zone of the virtual space while the virtual user reaches into the zone of the virtual space that is unavailable using the first mapping;
   wherein a nearest interactive object is within the zone of the virtual space that is unavailable using the first mapping and beyond a boundary defining a first virtual zone of the virtual space that is available using the first mapping and the zone of the virtual space that is unavailable using the first mapping relative to the virtual location of the virtual user.

21. The apparatus of claim 5, wherein the change in the selected one of the plurality of mappings is highlighted to the user within the virtual scene as a virtual visualization of the reaching of the virtual user into the zone of the virtual space that is unavailable using the first mapping.

22. The apparatus of claim 5, wherein the change in the selected one of the plurality of mappings is highlighted to the user within the virtual scene as a virtual visualization of the zone of the virtual space that is unavailable using the first mapping.

23. The apparatus of claim 1, wherein the virtual space comprises a sound space and a virtual visual space with audio-visual elements, such that a virtual point of view of the virtual user within the sound space corresponds to a virtual point of view of the virtual user within the virtual visual space, and the apparatus comprises a display to render at least parts of the virtual visual space and audio to the user in the real space.

* * * * *